(12) United States Patent
Swisher et al.

(10) Patent No.: US 9,635,845 B1
(45) Date of Patent: May 2, 2017

(54) ICE FISHING ACCESSORY SUPPORT APPARATUS

(71) Applicants: Travis Swisher, Groton, SD (US);
 Robert Swisher, Groton, SD (US)

(72) Inventors: Travis Swisher, Groton, SD (US);
 Robert Swisher, Groton, SD (US)

( * ) Notice: Subject to any disclaimer, the term of this patent is extended or adjusted under 35 U.S.C. 154(b) by 29 days.

(21) Appl. No.: 14/749,931

(22) Filed: Jun. 25, 2015

(51) Int. Cl.
| | |
|---|---|
| *A47F 7/00* | (2006.01) |
| *A01K 97/01* | (2006.01) |
| *A47B 3/00* | (2006.01) |
| *A47B 37/00* | (2006.01) |
| *A01K 97/10* | (2006.01) |
| *A01K 97/22* | (2006.01) |
| *A47B 43/00* | (2006.01) |
| *A47F 5/10* | (2006.01) |
| *A47B 81/00* | (2006.01) |
| *A47F 5/00* | (2006.01) |

(Continued)

(52) U.S. Cl.
 CPC .............. *A01K 97/01* (2013.01); *A01K 97/10* (2013.01); *A01K 97/22* (2013.01); *A47B 3/002* (2013.01); *A47B 37/00* (2013.01); *A47B 43/00* (2013.01); *A47B 47/022* (2013.01); *A47B 81/005* (2013.01); *A47B 96/027* (2013.01); *A47F 5/0018* (2013.01); *A47F 5/10* (2013.01); *A47F 5/103* (2013.01); *A47F 7/0028* (2013.01)

(58) Field of Classification Search
 CPC ........ A01K 97/00; A01K 97/01; A01K 97/22; A01K 97/10; A47B 37/00; A47B 3/002; A47B 81/005; A47B 43/00; A47B 45/00; A47B 96/02; A47B 96/027; A47B 47/02; A47B 47/021; A47B 47/022; A47B 21/00; A47F 5/08; A47F 7/0021; A47F 7/0028; A47F 7/0035; A47F 5/10; A47F 5/103; A47F 5/0018; A47F 5/0037; A47F 5/0043; A47F 5/0062
 USPC ........... 211/70.8, 195, 193, 13.1; 43/54.1, 4; 206/315.11; 224/922; D6/552; 108/50.11, 59, 92, 99, 162, 115
 See application file for complete search history.

(56) References Cited

U.S. PATENT DOCUMENTS 2,251,271 A * 8/1941 Del Campo, Jr. ... A47B 81/005
 211/64
2,390,640 A * 12/1945 Carlson ..................... E06C 7/14
 182/175

(Continued)

*Primary Examiner* — Jennifer E Novosad
(74) *Attorney, Agent, or Firm* — Jeffrey A. Proehl; Woods, Fuller, Shultz & Smith, P.C.

(57) ABSTRACT

An ice fishing accessory support apparatus for supporting fishing accessories may comprise a base portion for resting upon a surface, and an upright portion mounted on the base portion. The upright portion may be movable with respect to the base portion between collapsed and deployed positions. The collapsed position may be characterized by the upright portion oriented substantially parallel to the base portion and the deployed position being characterized by the upright portion oriented substantially perpendicular to the base portion. At least one shelf portion may be mounted on the upright portion, and may be movable between a lowered position and a raised position. The raised position may be characterized by the shelf portion oriented substantially perpendicular to the upright portion and the lowered position being characterized by the shelf portion oriented substantially parallel to the upright portion.

20 Claims, 4 Drawing Sheets

(51) Int. Cl.
*A47B 47/02* (2006.01)
*A47B 96/02* (2006.01)

(56) References Cited

U.S. PATENT DOCUMENTS

| | | | | |
|---|---|---|---|---|
| 3,359,928 A * | 12/1967 | Gamble | ................. | A01K 97/10 248/514 |
| 3,623,766 A * | 11/1971 | Funk | ...................... | A01K 97/22 297/188.01 |
| 3,997,181 A * | 12/1976 | Jaco | ........................ | B62B 1/264 280/47.19 |
| 4,355,818 A * | 10/1982 | Watts | ....................... | B62B 1/12 280/47.19 |
| 4,526,414 A * | 7/1985 | Jones | ..................... | A01K 97/06 294/143 |
| D286,699 S * | 11/1986 | Thomas, Jr. | ................... | D34/26 |
| 4,908,973 A | 3/1990 | Perks | | |
| 5,159,777 A * | 11/1992 | Gonzalez | ............... | A01K 97/08 280/47.19 |
| 5,203,815 A * | 4/1993 | Miller | ................... | A01K 97/08 211/149 |
| 5,209,539 A * | 5/1993 | Atalay | ................... | A63B 55/10 211/198 |
| 5,285,906 A * | 2/1994 | Wisnowski | .......... | A63C 11/028 211/62 |
| 5,345,708 A | 9/1994 | Loyd | | |
| 5,487,475 A * | 1/1996 | Knee | ................... | A47G 25/005 211/70.8 |
| D372,143 S * | 7/1996 | Selby | ............................ | D3/315 |
| D372,350 S * | 7/1996 | Olson | ............................ | D34/24 |
| 5,626,379 A * | 5/1997 | Scott | ..................... | A47B 81/005 211/195 |
| 5,987,801 A | 11/1999 | Anderson | | |
| 6,082,757 A * | 7/2000 | Lin | ........................ | A01K 97/22 16/429 |
| 6,170,189 B1 | 1/2001 | Klein | | |
| 6,196,560 B1 * | 3/2001 | Ohlsson | .................... | B62B 1/12 182/20 |
| 6,360,902 B1 * | 3/2002 | Searles | ................. | A47B 81/005 211/70.8 |
| 6,487,814 B1 * | 12/2002 | Arredondo | ............. | A01K 97/06 206/315.11 |
| 6,594,941 B1 * | 7/2003 | Anderson | ............... | A01K 97/01 43/17 |
| 6,880,851 B1 * | 4/2005 | Summers | ................ | B62B 1/266 280/43.1 |
| 6,883,267 B1 * | 4/2005 | Pruitt | ..................... | A01K 97/22 280/47.19 |
| 7,320,470 B1 * | 1/2008 | Butera | ................... | A01K 97/08 280/47.18 |
| 8,181,797 B2 * | 5/2012 | Edwards | ................ | A47B 43/00 211/195 |
| D671,291 S * | 11/2012 | Spann | ........................... | D34/14 |
| 8,375,858 B2 * | 2/2013 | Steadman, Sr. | ............ | F42B 4/20 102/343 |
| 8,479,928 B2 * | 7/2013 | Tanabe | ................... | A47B 43/00 211/186 |
| 8,523,196 B1 * | 9/2013 | Appleby | ................... | B62B 1/26 135/95 |
| D699,477 S * | 2/2014 | Allen | ............................ | D6/552 |
| 8,807,648 B2 * | 8/2014 | Carroll | ..................... | A47C 7/62 297/188.08 |
| 8,931,203 B2 | 1/2015 | Baugh | | |
| 2004/0237374 A1 | 12/2004 | Klein | | |
| 2006/0124258 A1 | 6/2006 | Zikos | | |
| 2008/0282597 A1 | 11/2008 | Gascoingne | | |
| 2011/0185621 A1* | 8/2011 | Lamb | ...................... | A01K 97/10 43/21.2 |
| 2012/0151818 A1 | 6/2012 | Orth | | |
| 2014/0298707 A1 | 10/2014 | Wolfbauer | | |
| 2014/0373429 A1 | 12/2014 | Kurowski | | |

* cited by examiner

ICE FISHING ACCESSORY SUPPORT APPARATUS

BACKGROUND

Field

The present disclosure relates to fishing accessories and more particularly pertains to a new ice fishing accessory support apparatus for providing a convenient and secure location for holding fishing accessories while ice fishing.

SUMMARY

In one aspect, the present disclosure relates to an ice fishing accessory support apparatus for supporting fishing accessories on a surface. The apparatus may comprise a base portion for resting upon the surface and an upright portion mounted on the base portion, with the upright portion being movable with respect to the base portion between a collapsed position and a deployed position. The collapsed position may be characterized by the upright portion being oriented substantially parallel to the base portion and the deployed position may be characterized by the upright portion being oriented substantially perpendicular to the base portion. The apparatus may also comprise at least one shelf portion being mounted on the upright portion, and the at least one shelf portion may be movable with respect to the upright portion. The shelf portion may be movable between a lowered position and a raised position, with the raised position being characterized by the shelf portion being oriented substantially perpendicular to the upright portion and the lowered position being characterized by the shelf portion being oriented substantially parallel to the upright portion.

In another aspect, the disclosure relates to an ice fishing accessory support apparatus for supporting fishing accessories on a surface. The apparatus may comprise a base portion for resting upon the surface, and an upright portion mounted on the base portion. The upright portion may be pivotally movable with respect to the base portion between a collapsed position and a deployed position, with the collapsed position being characterized by the upright portion being oriented substantially parallel to the base portion and the deployed position being characterized by the upright portion being oriented substantially perpendicular to the base portion. The apparatus may also comprise a pair of shelf portions pivotally mounted on the upright portion. The shelf portions may be movable between a lowered position and a raised position, with the raised position being characterized by the shelf portions being oriented substantially perpendicular to the upright portion and the lowered position being characterized by the shelf portions being oriented substantially parallel to the upright portion. The apparatus may also comprise at least one pole holding assembly configured to support a pole on the apparatus.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

Figure 1:
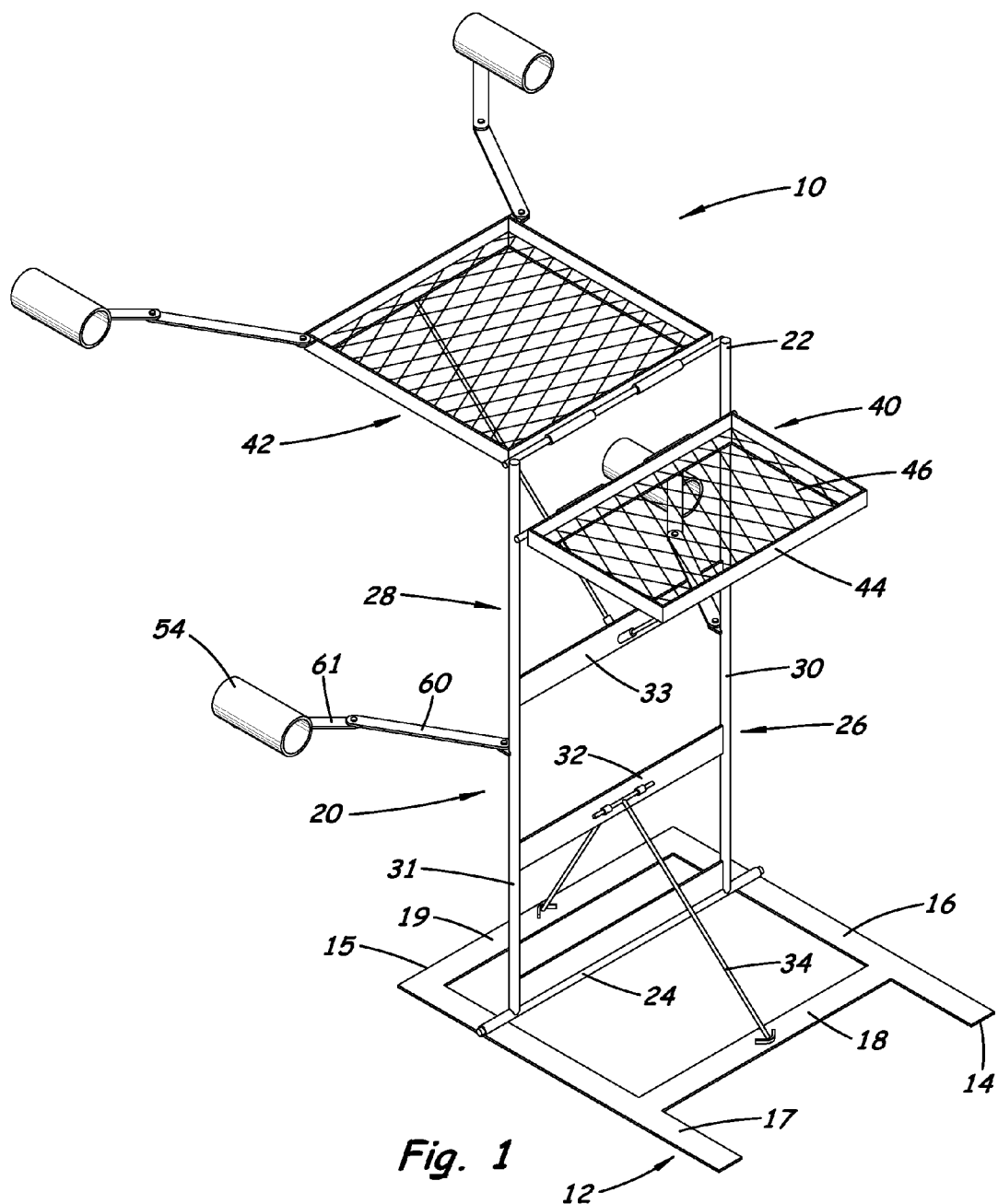
FIG. 1 is a schematic perspective view of a new fishing accessory support apparatus according to the present disclosure, shown in a deployed condition.

With reference now to the drawings, and in particular to FIGS. 1 through 4 thereof, a new fishing accessory support apparatus embodying the principles and concepts of the disclosed subject matter will be described.

In one aspect, the disclosure is directed to an ice fishing accessory support apparatus 10 for supporting one or more fishing accessories 1 on a surface 2. In some highly suitable applications, the surface 2 comprises the upper surface of the ice covering on a body of water. A variety of fishing accessories 1 may be suitable to be supported on the apparatus 10, including, for example, fishing poles, tackle, remote fish viewing devices, et. In a general sense, the accessory support apparatus 10 may include a base portion 12 for resting upon the surface 2, an upright portion 20 mounted on the base portion and positionable in a substantially upright orientation with respect to the surface 2, at least one shelf portion 40 mounted on the upright portion 20, and in many embodiments also includes at least one pole holding assembly 50. In many embodiments, the apparatus 10 is moveable between a collapsed condition and a deployed condition.

In greater detail, the base portion 12 has a first end 14 and a second end 15, and in use a section of the base portion 12 adjacent to the first end 14 may be positioned under a relatively heavy object to help stabilize the apparatus 10, and the second end 15 may be positioned adjacent to a hole formed in the surface, such as a hole formed in the ice and used for ice fishing. The base portion 12 may include at least one leg member 16 which may be configured to rest upon the surface and extend substantially parallel to the surface. In some embodiments a pair of leg members 16, 17 may be implemented for the base portion, and the leg members may be oriented substantially parallel to each other. The base portion 12 may further include at least one transverse member 18 that extends between the leg members 16, 17 to connect the leg members together and may also maintain the leg members in a substantially parallel orientation. Embodiments of the base portion 12 may include a pair of the transverse members 18, 19 which extend between the pair of leg members, and one of the transverse members 18 may be located toward the first end 14 of the base portion and another one of the transverse members 19 may be located toward the second end 15 of the base portion.

Figure 2:
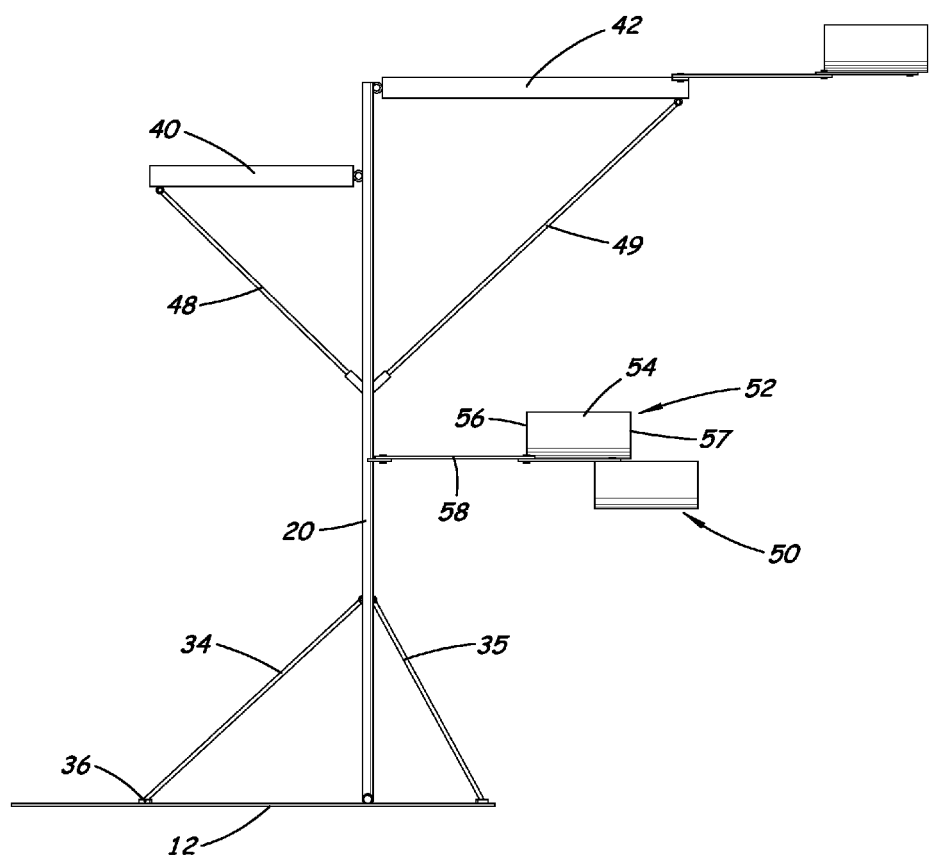
FIG. 2 is a schematic side view of the apparatus shown in a deployed condition, according to an illustrative embodiment.
Figure 3:
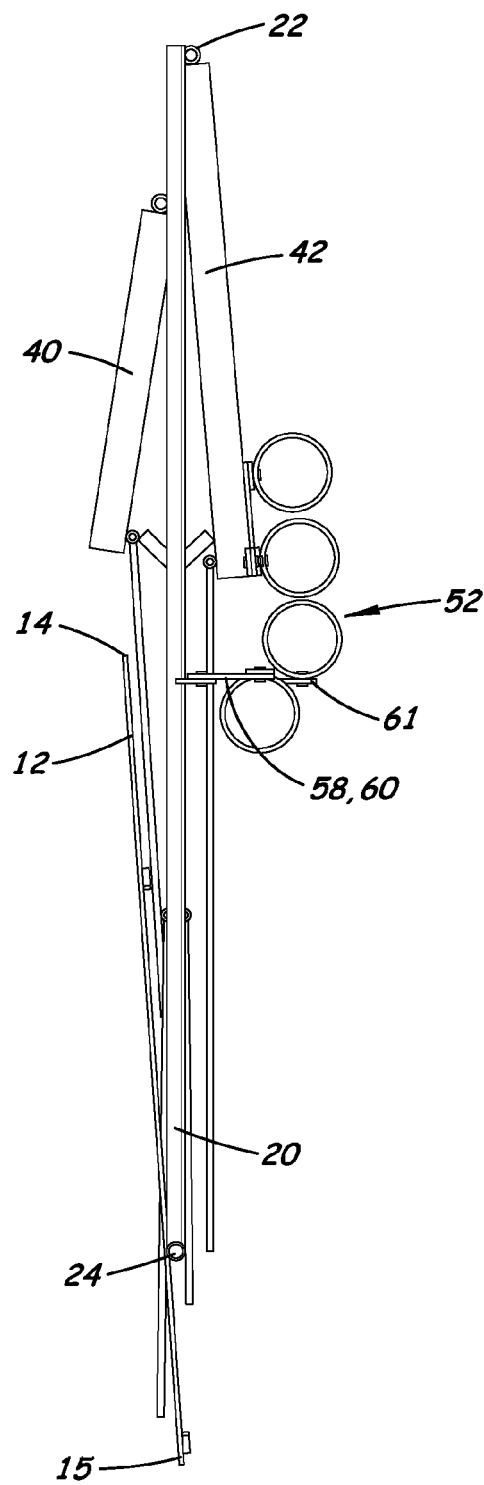
FIG. 3 is a schematic side view of the apparatus shown in a collapsed condition, according to an illustrative embodiment.
Figure 4:
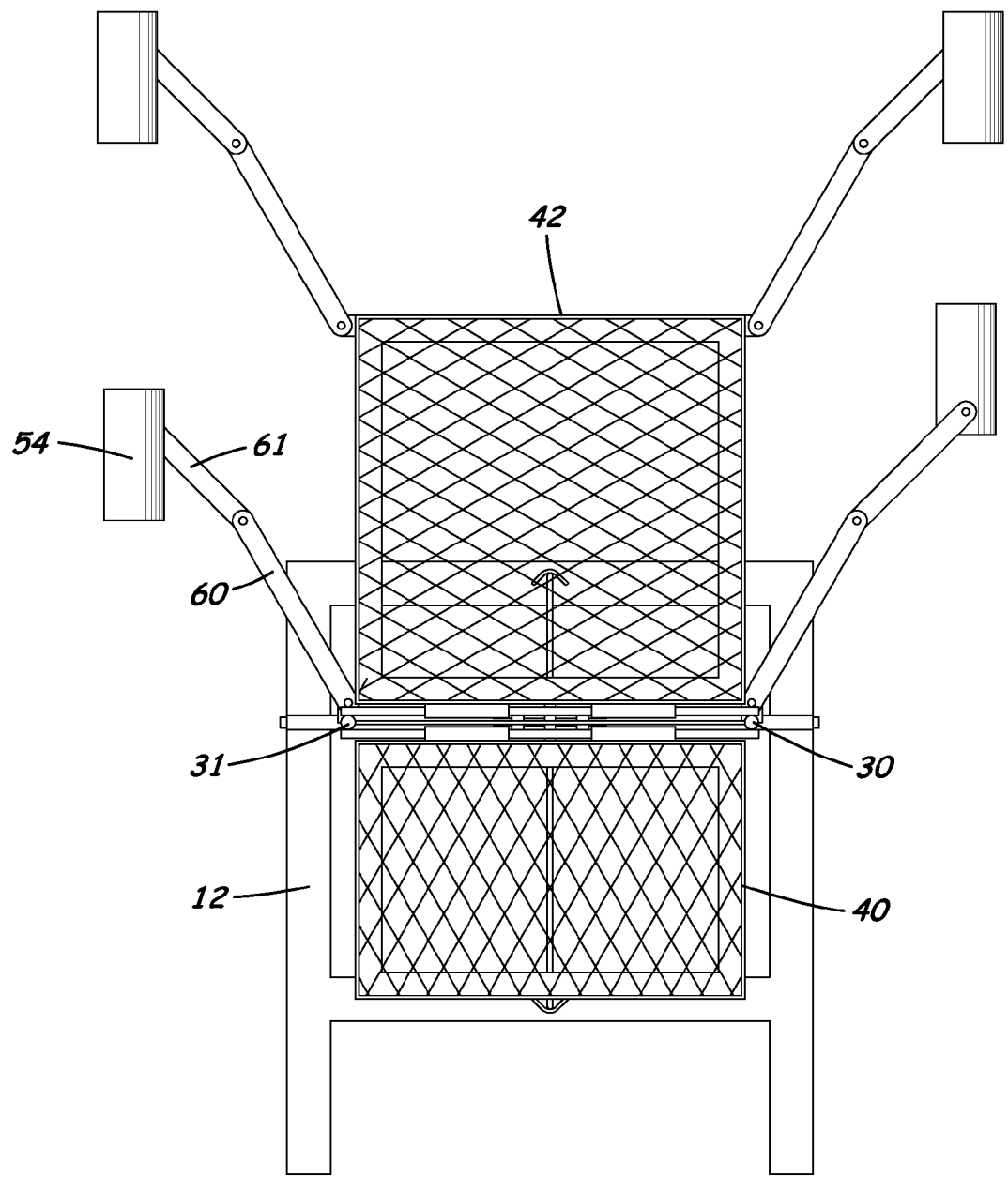
FIG. 4 is a schematic top view of the apparatus in the deployed condition, according to an illustrative embodiment.

The upright portion 20 may be movably mounted on the base portion to move between a collapsed position (see FIG. 3) and a deployed position (see FIGS. 1 and 2). The collapsed position generally corresponds to the collapsed condition of the apparatus 10 and may be characterized by the upright portion 20 being oriented substantially parallel to the base portion 12, and the deployed position generally corresponds to the deployed condition of the apparatus 10 and may be characterized by the upright portion being oriented substantially perpendicular to the base portion. The upright portion 20 may have an upper end 22 and a lower end 24, and the lower end may be mounted on the base portion at a location between the first 14 and second 15 ends of the base portion. in some embodiments, the upright portion 20 may be pivotably mounted on the base portion 12 such that the upright portion pivots between the collapsed and deployed positions. The upright portion 20 may also have a front side 26 generally oriented towards the first end of the base portion, and may also have a rear side 28 which is generally oriented towards the second end 15.

The upright portion 20 may include at least one spine member 30 and illustratively includes a pair of spine members 30, 31 which may be laterally spaced from each other in a substantially parallel relationship. In embodiments having a pair of the spine members, at least one cross member 32 may be included and a plurality of the cross members 32, 33 may be included to extend between the pair of spine members. The cross members may form mounting points or locations for various elements of the apparatus 10 described herein. The upright portion 20 may also include at least one prop member 34 for holding the upright portion 20 in the deployed position with respect to the base portion. Illustratively, the prop member 34 may extend from one of the cross members 32 to one of the transverse members 18 of the base portion, and the prop member may be removably mounted to at least one of the cross 32 and transverse 18 members. The removable mounting of the prop member 34 may be formed by a socket 36 formed on either one of the cross member or the transverse member. The socket 36 may be configured to receive one end of the prop member, while an opposite end of the prop member may be movably or pivotably mounted on the other of the cross or transverse members on which the prop member is mounted. In some embodiments, a pair of the prop members 34, 35 may be utilized, with each of the prop members extending between one of the cross members to a different one of the transverse members on the base portion. The prop members 34, 35 may be positioned on opposite sides of the upright portion 20, with one of the prop members 34 being located on the front side 26 of the upright member with another one of the prop members 35 being located on the rear side 28 of the upright member. Illustratively, the prop members may each be pivotably mounted on the cross members of the upright portion and may be removably mounted (e.g., via a socket 36) on one of the transverse members of the base portion.

The apparatus 10 may include at least one shelf portion 40 and in some embodiments may include a pair of shelf portions 40, 42. The shelf portions may be mounted on the upright portion 20 and may be movable with respect to the upright portion between a lowered position (see FIG. 3) and a raised position (see FIGS. 1 and 2). The raised position generally corresponds to the deployed condition of the apparatus 10 and may be characterized by the shelf portion being oriented substantially perpendicular to the upright portion, and the lowered position generally corresponds to the collapsed condition and may be characterized by the shelf portion 40 being oriented substantially parallel to the upright portion. In some embodiments, the pair of shelf portions 40, 42 may extend in substantially opposite directions from the upright portion, and may extend from opposite sides 26, 28 of the upright portion. More specifically, one of the shelf portions 40 may extend from the front side 26 of the upright portion and another one of the shelf portions 42 may extend from the rear side 28 of the upright portion. One of the shelf portions may be located on the upright portion closer to the upper end 22 while another one of the shelf portions may be located on the upright portion relatively closer to the lower end 24.

In the illustrative embodiments, each of the shelf portions 40, 42 may include a frame member 44 which may form a perimeter of the shelf portion and may be substantially rectangular in shape. The shelf portions may also include a panel member 46 which extends across the frame member 44 to form a support surface for accessories resting upon the shelf portion. The panel member 46 may be fixed to the frame member along a perimeter of the panel member. In some embodiments, the panel member 46 may be reticulated in character and may be formed of an expanded metal, while in other embodiments the panel member may be formed of a continuous sheet of material. Reticulated forms of the panel member have the advantage of readily draining liquids from the panel member and not holding snow and ice, while generally contributing less weight to the apparatus 10. Each of the shelf portions may also include a support member 48 for releasably supporting the frame member in the raised position of the shelf portion. A support member 48, 49 may be provided for each of the pair of shelf portions to independently support the shelf portions in the raised position. The support member 48 may extend from the frame member 44 to one of the cross members 32 of the upright portion, and may be removably mounted to at least one of the frame and cross members. The removable mounting of the support member may be formed by a socket located on one of the cross and frame members for receiving one end of the support member, while the opposite end of the support member may be pivotably mounted to one member of the cross member and the frame member. Illustratively, the support member may be pivotably mounted on one of the cross members of the upright portion and may be removably mounted on the frame member of the shelf portion by a socket.

The apparatus 10 may include at least one pole holding assembly 50, and may include multiple pole holding assemblies mounted on the upright portion and/or one or more of the shelf portions. Illustratively, a pair of the pole holding assemblies may be mounted on the upright portion and another pair of pole holding assemblies may be mounted on one or both of the shelf portions. Each pole holding assembly may comprise a sleeve 54 which may be substantially hollow in character for receiving a portion of a pole, such as the handle end portion of the pole. The sleeve 54 may have a proximal end 56 and a distal end 57, with the distal end generally being for receiving the end portion of the pole. A support arm 58 may connect the sleeve 54 to one of the portions of the apparatus 10, such as the frame member of a shelf portion or one of the spine members of the upright portion. Illustratively, the support arm 58 may include at least one segment 60 which is pivotably mounted on the sleeve, such as at the proximal end 56 of the sleeve, and may also be pivotably mounted on one of the portions of the apparatus 10. The support arm 58 may include two or more segments 60, 61 which are pivotably connected to each other to form an articulated arm with multiple pivot points to facilitate the collapsing of the apparatus 10 into a more compact form for the collapsed condition of the apparatus 10.

In use, the accessory support apparatus 10 may be placed in a collapsed condition in which the upright portion 20 is in a collapsed position with respect to the base portion, and the shelf portions are in a lowered position with respect to the upright portion, and any pole holding assemblies are articulated into a position that is close to the upright portion. By the structure of the apparatus 10, the collapsed condition of the apparatus is highly compact to facilitate transport to, for example, an ice fishing site, but also presents an easily and compactly storable form for the apparatus. During use, such as at an ice fishing hole, the upright portion may be moved to a deployed position with respect to the base portion, and the prop member or members may be deployed to support the upright portion in a substantially perpendicular orientation with respect to the base portion. The shelf portions may be utilized to support a portion of a remote viewing device which has a transmission cable that extends from a main unit and may be positioned through the hole in the ice and has a camera at the end of the transmission cable which may be positioned below the surface of the ice for viewing fish or other features of the body of water that are not otherwise apparent through the fishing hole.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

We claim:

1. An ice fishing accessory support apparatus for supporting fishing accessories on a surface, the apparatus comprising:
    a base portion for resting upon the surface and having first and second ends;
    an upright portion having a front side and rear side located on an opposite side of the upright portion, the upright portion being pivotally mounted on the base portion at a location on the base portion intermediate the first and second ends of the base portion such that sections of the base portion extend both forwardly and rearwardly from the pivot mounting of the upright portion to the base portion, the upright portion being movable with respect to the base portion between a collapsed position and a deployed position, the collapsed position being characterized by the upright portion being oriented substantially parallel to the base portion and the deployed position being characterized by the upright portion being oriented substantially perpendicular to the base portion; and
    at least one shelf portion being mounted on one of the sides of the upright portion, the at least one shelf portion being movable with respect to the upright portion, wherein the shelf portion is movable between a lowered position and a raised position, the raised position being characterized by the shelf portion being oriented substantially perpendicular to the upright portion, the lowered position being characterized by the shelf portion being oriented substantially parallel to the upright portion.

2. The apparatus of claim 1 wherein the at least one shelf portion comprises a pair of shelf portions, and each of the shelf portions is positioned on an opposite said side of the upright portion and extends outwardly from the respective said sides of the upright portion.

3. The apparatus of claim 2 wherein one of the shelf portions is located closer to an upper end of the upright portion than another one of the shelf portions.

4. The apparatus of claim 1 wherein the at least one shelf portion comprises a pair of shelf portions; and
    wherein a first shelf portion of the pair of shelf portions extends in the same direction as one section of the base portion and extends beyond the respective end of the one section of the base portion; and
    wherein a second shelf portion of the pair of shelf portions extends in the same direction as another section of the base portion and does not extend beyond the respective end of the another section of the base portion.

5. The apparatus of claim 1 wherein the at least one shelf portion comprises a frame member forming a perimeter; a panel member extending across the perimeter of the frame member; and a support member releasably supporting the frame member in the raised position.

6. The apparatus of claim 5 wherein the support member extends from the frame member to a cross member of the upright portion, the support member being removably mounted to at least one member of the frame member and the cross member.

7. The apparatus of claim 6 wherein the support member is pivotally mounted to the frame member and is removably mounted on the cross member.

8. The apparatus of claim 5 additionally comprising at least one pole holding assembly mounted on one of the shelf portions and being configured to support a pole on the apparatus.

9. The apparatus of claim 8 wherein the at least one pole holding assembly comprises a sleeve being substantially hollow for receiving a portion of a pole and a support arm connecting the sleeve to one of the upright and shelf portions.

10. The apparatus of claim 9 wherein the support arm is articulated.

11. The apparatus of claim 10 wherein the support arm includes a plurality of segments pivotally mounted on the sleeve and pivotally mounted on one of the upright and shelf portions, the segments being pivotally connected to each other.

12. The apparatus of claim 1 wherein a first section of the base portion adjacent the first end extends rearwardly from the rear side of the upright portion and a second section of the base portion adjacent the second end extends forwardly of the front side of the upright portion.

13. The apparatus of claim 12 wherein the base portion has a length measured from the first end to the second end, and approximately one quarter of the length of the base portion is located on one said side of the upright portion and approximately three quarters of the length of the base portion is located on an opposite said side of the upright portion.

14. The apparatus of claim 1 wherein the at least one shelf portion is pivotally mounted on the upright portion.

15. The apparatus of claim 1 wherein the base portion has a bottom that forms a substantially continuous contact surface between the first and second ends to rest upon the surface.

16. The apparatus of claim 15 wherein the bottom contact surface lies substantially entirely in a single plane between the first and second ends of the base portion.

17. An ice fishing accessory support apparatus for supporting fishing accessories on a surface, the apparatus comprising:
   a base portion for resting upon the surface and having first and second ends, the base portion having a bottom forming a substantially continuous contact surface between the first and second ends to rest upon the surface, the bottom contact surface extending substantially entirely in a single plane between the first and second ends of the base portion;
   an upright portion having a front side and rear side located on an opposite side of the upright portion, the upright portion being pivotally mounted on the base portion at a location on the base portion intermediate the first and second ends of the base portion such that sections of the base portion extend both forwardly and rearwardly from the pivot mounting of the upright portion to the base portion, the upright portion being pivotally movable with respect to the base portion between a collapsed position and a deployed position, the collapsed position being characterized by the upright portion being oriented substantially parallel to the base portion and the deployed position being characterized by the upright portion being oriented substantially perpendicular to the base portion; and
   a pair of shelf portions pivotally mounted on the upright portion, the shelf portions being movable between a lowered position and a raised position, the raised position being characterized by the shelf portions being oriented substantially perpendicular to the upright portion, the lowered position being characterized by the shelf portions being oriented substantially parallel to the upright portion, each of the shelf portions being positioned on opposite said sides of the upright portion and extending outwardly from the opposite said side of the upright portion; and
   at least one pole holding assembly mounted on one of the shelf portions and being configured to support a pole on the apparatus.

18. The apparatus of claim 17 wherein the pair of shelf portions extend in substantially opposite directions from the upright portion.

19. The apparatus of claim 17 wherein the at least one pole holding assembly is mounted on the upright portion.

20. The apparatus of claim 17 wherein the at least one pole holding assembly is mounted on one of the shelf portions.

* * * * *